United States Patent [19]

Åsberg

[11] 3,741,030

[45] June 26, 1973

[54] DRIVING GEAR ASSEMBLY FOR A MOTOR VEHICLE

[75] Inventor: Sture Åsberg, Savedalen, Sweden

[73] Assignee: SKF Industrial Trading and Development Company, N.V., Amsterdam, Netherlands

[22] Filed: June 30, 1971

[21] Appl. No.: 158,500

[30] Foreign Application Priority Data
June 30, 1970  Denmark .............................. 09652
June 30, 1970  Denmark .............................. 09654

[52] U.S. Cl. ................................. 74/424, 308/191
[51] Int. Cl. ......................... F16h 1/18, F16c 33/00
[58] Field of Search.................. 74/424; 308/191 X, 308/216, 204

[56] References Cited
UNITED STATES PATENTS

| | | |
|---|---|---|
| 3,572,154 | 3/1971 | Bartolomucci ....................... 74/424 |
| 2,444,724 | 7/1948 | Brown ................................. 308/216 |
| 3,454,314 | 7/1969 | Sanguinetti ......................... 308/191 |
| 3,583,511 | 6/1971 | Åsberg ................................ 308/191 |

Primary Examiner—Leonard H. Gerin
Attorney—Howson & Howson

[57] ABSTRACT

Driving gear assembly for a motor vehicle of the type having a crown wheel, a pinion wheel engaging the crown wheel and a differential mechanism secured to the crown wheel, said crown wheel having an axial bearing adjacent its periphery and adjacent at least one of the bearings of the pinion, characterized in that the pinion has a design with axial length and diameter such that the cross point of the load line of the mating crown wheel and pinion upon the axis of the pinion shaft coincides or almost coincides with the point of intersection of the load lines of said adjacent pinion shaft bearing, both crown wheel and pinion being located in the housing in proper position with respect to said housing and to each other without the use of adjusting means.

5 Claims, 1 Drawing Figure

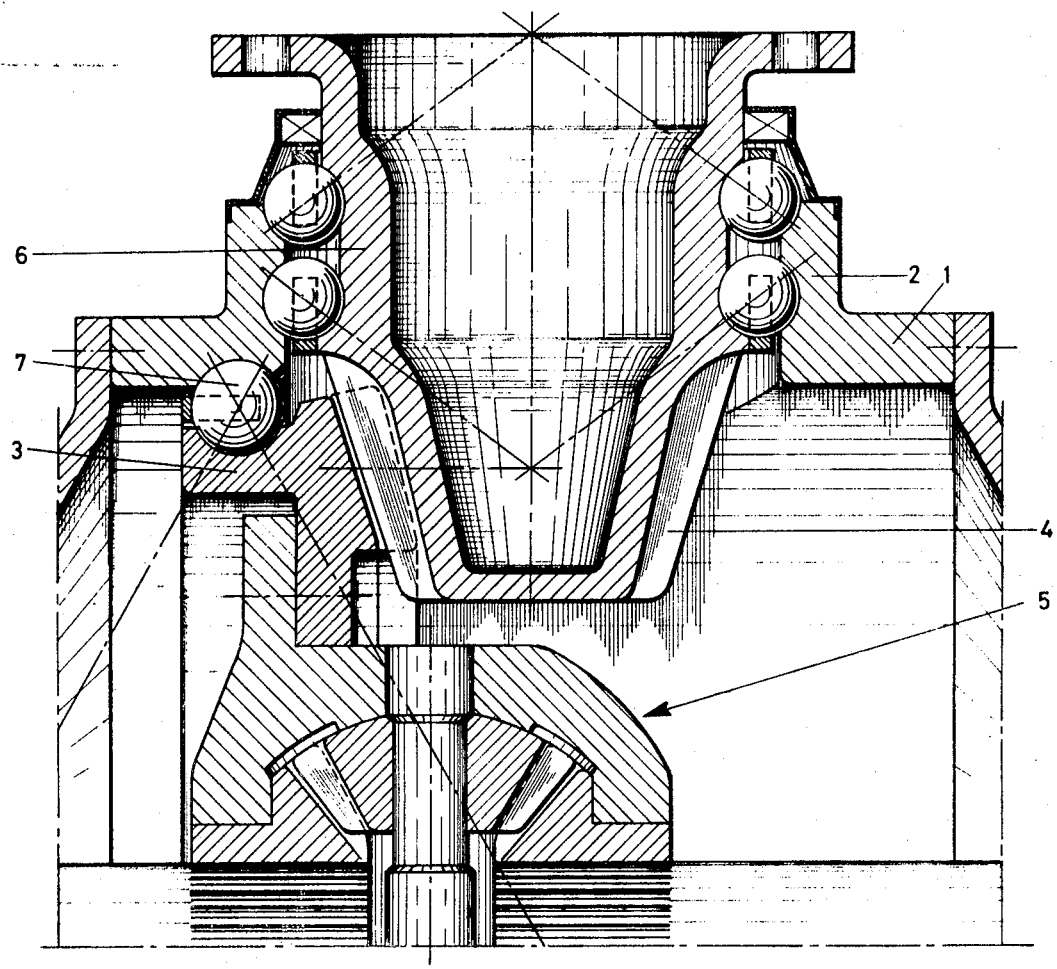
INVENTOR:
STURE ASBERG

DRIVING GEAR ASSEMBLY FOR A MOTOR VEHICLE

The invention relates to a driving gear assembly for a motor vehicle of the type having a crown wheel, a pinion wheel engaging the crown wheel and a differential mechanism secured to the crown wheel, said crown wheel having an axial radial bearing adjacent its periphery and adjacent at least one of the bearings of the pinion. A driving gear assembly of this kind is known from U.S. Pat. specification No. 3,344,687 and a driving gear assembly known from this specification has an axial radial ball bearing at the periphery of the crown wheel which means that the crown wheel is supported at the right place, whilst the pinion is a normal construction having a pinion shaft supported in the housing by means of two conical roller bearings which construction due to the normal methods of manufacturing and due to the occurring loads during operation has to be properly adjusted and preloaded to be able to meet the operative conditions. This preloading to the exact extent has to occur simultaneously with the adjusting and this is a time-consuming process which is extremely difficult in case of repairs and in many cases does not lead to a good result.

Purpose of the invention is to provide a driving gear assembly which due to its overall rigidity meets the existing problems. According to the invention this has been achieved in that the pinion has a design with axial length and diameter such that the cross point of the load line of the mating crown wheel and pinion upon the axis of the pinion shaft coincides or almost coincides with the point of intersection of the load lines of said adjacent pinion shaft bearing, both crown wheel and pinion being located in the housing in proper position with respect to said housing and to each other without the use of adjusting means. Now the design of the pinion has been changed as well to a degree such that the loads are taken up the correct way and this makes it possible to manufacture in such a manner and with a precision such that adjusting means no longer are necessary. Accordingly one only needs to assemble crown wheel and pinion in the housing. This simplifies manufacturing and opens the possibility to manufacture the assembly as a unit which can be replaced as such. This again opens the possibility to change and simplify the construction further and this accordingly leads to a construction in which the race surfaces for the bearings of pinion and crown wheel are machined in integral parts of the housing or parts detachably connected thereto as well as in parts integral with or detachably fixed to said last mentioned members. There is thus obtained a driving gear that is predetermined after the assembly of the balls or rollers of the bearing and then forms an undisconnectable entity the axial radial bearing of the pinion functioning to maintain the preloading introduced during the assembling process and this in cooperation with the axial radial bearing of the crown wheel located in the immediate facility therewith. The exact location of the race surfaces contributes in the elimination of adjustments in case the race surfaces are integral with the parts of housing and rotatable elements since due to said measure the number of places where tolerances can occur is reduced considerably.

The pinion is preferably constructed such that the pinion consists of a hollow forged member having a flange to which connects a mainly cylindrical member with bearing grooves for the bearings, a conical member on which the teeth are formed and a short closed end.

The driving gear assembly according to the invention preferably has the outer races for the crown wheel bearing made in the wall of the housing and the outer races for the pinion are made in an integral cylindrical housing part with an axis transverse to the axis of the crown wheel bearing and with a radius which is almost equal to the distance of the plane of the crown wheel bearing from the axis of the pinion.

Due to this a rigid construction is obtained assuring that elastic deformation and surface contact deformation no longer affect the life of the mechanism.

Due to the manner of supporting the crown wheel with its differential gear set attached to it at the periphery of said crown wheel elastic deformation and surface contact deformation is reduced. Further due to the fact that the point of intersection of the load line with the axis of the pinion and the point of intersection of the load lines of the bearing of the pinion shaft adjacent the pinion gear wheel are almost at the same spot crown wheel and pinion have a rigidity such that the proper location of said wheels with respect to each other and with respect to the housing not only is present from the very beginning, but is maintained during operation, and this ensures noiselessness and considerable life time.

Preferably the bearing surfaces for the crown wheel bearing and for the pinion shaft bearings are machined in one and the same housing the outer races for the crown wheel bearing being given a radius which is almost equal to the distance of the plane of the crown wheel bearing from the axis of the pinion. Due to this two bearings are very close to each other which contributes in the rigidity of the entire construction and accordingly improves life time.

The invention will now be further elucidated with reference to the drawing which in cross section shows a driving gear assembly made according to the invention.

The driving gear assembly according to the driving comprises a housing 1 of generally cylindrical form having a transverse short cylindrical portion 2. Within said housing is mounted a crown wheel 3 cooperating with a pinion 4.

The differential mechanism is only schematically indicated at 5.

In the cylindrical portion 2 is supported a pinion wheel shaft by means of two ball bearings the race surfaces of which are made in the material of the housing part 2 and of the pinion shaft 6.

The crown wheel is supported in the housing 1 by means of a biaxial radial one-row ball bearing 7 having its races made in the material of the crown wheel and the housing.

The races of all bearings are close together, the radius of the outer race surfaces of the pinion shaft bearings being almost the same as the distance of the plane of the bearing 7 from said axis of said outer race. Accordingly high accuracy in manufacturing said races rigidity due to their close arrangement, precision of the gear teeth and the provision of integral races provide a construction which after assembling is a unit. This unit has only tolerances between the balls and their races which facilitate high precision.

What we claim is:

1. A drive gear assembly for a motor vehicle comprising a housing, a crown wheel mounted in said housing, a pinion shaft having a pinion engaging the crown wheel, a differential mechanism secured to said crown wheel, a pair of closely spaced bearings rotatably supporting said pinion in said housing, an axial radial bearing for said crown wheel adjacent its periphery and adjacent at least one of said pinion bearings, said pinion being of a predetermined axial length and diameter so that the cross point of the load line of the mating crown wheel and pinion upon the axis of said pinion shaft substantially coincides with the point of intersection of the load lines of said adjacent pinion shaft bearings, said crown wheel and pinion being located in said housing in proper position with respect thereto and to each other without the need for adjusting means.

2. The drive gear assembly as claimed in claim 1 wherein the inner race surfaces for the pinion bearings are formed integrally in said pinion.

3. A drive gear assembly as claimed in claim 2 wherein the outer race surfaces for the pinion bearings are formed integrally in said housing.

4. A drive gear assembly as claimed in claim 3 wherein the outer raceway of said crown wheel bearing is formed integrally in said housing.

5. A drive gear assembly as claimed in claim 1 wherein the outer raceway for the crown wheel bearing is of a radius approximately equal to the distance of the plane of the crown wheel bearing from the axis of said pinion.

* * * * *